United States Patent

[11] 3,575,099

[72] Inventors Gerald Isaak Pasternak Levenson; Andrew Green, Harrow, England
[21] Appl. No. 705,329
[22] Filed Feb. 14, 1968
[45] Patented Apr. 13, 1971
[73] Assignee Eastman Kodak Company Rochester, N.Y.
[32] Priority Feb. 16, 1967
[33] Great Britain
[31] 7409/67

[54] DENTAL X-RAY PROCESSING APPARATUS
5 Claims, 16 Drawing Figs.

[52] U.S. Cl. ........ 95/89, 141/83
[51] Int. Cl. ........ G03d 3/16
[50] Field of Search ........ 95/89, 90, 90.5, 94; 141/83, 94, 329, (Inquired)

[56] References Cited

UNITED STATES PATENTS

| | | | |
|---|---|---|---|
| 3,195,436 | 7/1965 | Decrop | 95/90 |
| 3,245,200 | 4/1966 | Shaw | 141/329X |
| 3,280,718 | 10/1966 | Decrop | 95/90 |
| 3,322,053 | 5/1967 | Good | 95/89 |
| 3,403,826 | 10/1968 | Buford et al. | 141/83X |

FOREIGN PATENTS

| | | | |
|---|---|---|---|
| 1,326,421 | 4/1963 | France | 95/89 |

*Primary Examiner*—Norton Ansher
*Assistant Examiner*—Fred L. Braun
*Attorneys*—Walter O. Hodsdon and Paul R. Holmes

ABSTRACT: An apparatus for processing film that injects fluid into a self-sealing package containing a photosensitive film, measures the distension of the package, terminates the flow of fluid into the package when the package has reached a predetermined size and agitates the package to cause the injected fluid to flow uniformly upon the film emulsion.

ANDREW GREEN
GERALD I.P. LEVENSON
INVENTORS

BY Walter O. Hodsdon
Paul P. Holmes
ATTORNEYS

Patented April 13, 1971 3,575,099

4 Sheets-Sheet 2

ANDREW GREEN
GERALD I. P. LEVENSON
INVENTORS

BY Walter O. Hodsdon
Paul R. Holmes
ATTORNEYS

ANDREW GREEN
GERALD I. P. LEVENSON
INVENTORS
BY Walter O. P. Todd
Paul P. Holmes
ATTORNEYS

ANDREW GREEN
GERALD I. P. LEVENSON
INVENTORS

BY Walter O. Hodsdon
Paul V. R. Holmes
ATTORNEYS

DENTAL X-RAY PROCESSING APPARATUS

BACKGROUND OF THE INVENTION

Dental X-ray film is normally packed in a light-tight and saliva proof packet or package. When radiographs of a patient's teeth are being made, the entire package containing the film is placed in the patient's mouth. After the exposure has been made, the package is removed and sent to a processing station. Because the film is light sensitive, the package must be opened and the film processed in a darkened area or room. After being removed from the package, the film is placed into the developing and fixing solutions. Every X-ray exposure from every patient goes through the same steps and procedure. Because of the physical requirements of such a process and the multiplicity of steps contained therein, such a process is time consuming and costly. When the time required for processing of one patient's X-rays is multiplied by several patients in a day, the time and cost involved increases rapidly. Because of this it has been the custom to expose a patient's dental X-rays on one visit and have them developed and ready for use on a second subsequent visit; otherwise the valuable time of a dentist is devoted to a period of relative inactivity waiting the processing of the film.

There therefore is a need for a system which will facilitate the rapid processing of exposed X-ray film in the dentist's office. Several attempts have been made to satisfy this need. Dental film packages have been developed with pods of developer and fixer contained therein. After the exposure of the film, the developer pod is ruptured allowing the solution to cover the film in the package. After a time, the fixer solution is released in a similar manner. The film is then removed from the package by the dentist. The package however is bulky for oral use and is also expensive.

Another system uses a hypodermic needle to inject developer fluid into the packet to process the film. In this system, however, there is a danger of the operator or the film being scratched or pierced by the needle.

There presently is a demand for an apparatus and procedure which would enable a dentist or technician to expose a film and immediately process the package in a normally lighted room thereby allowing the dentist to examine the X-rays shortly after exposure and without requiring a return visit on the part of the patient.

SUMMARY OF THE INVENTION

The invention provides an apparatus for processing a photographic element contained in a package comprising means for receiving the package, an injector for piercing the cover and means for pumping a predetermined quantity of processing fluid through the injector into the package.

The pumping of processing fluid into the package is initiated by the package itself on insertion into the package receiving means. The package receiving means is preferably in the form of a pair of jaws whereinto the package is inserted, the injector being located between the jaws.

Sensing means are provided to terminate the injection of processing fluid into the package when the package has swollen to a predetermined size. Visible or audible alarm means are also provided for indicating when the package is full. The injector is preferably in the form of a hypodermic needle and is located in a retractable sheath or other cover to avoid contamination of the needle and oxidation of processing fluid thereon prior to insertion of the injector into a package.

The apparatus is conveniently provided with a processing fluid container which is of a flexible material. Sensing means are provided for indicating when the container requires refilling or replacing. Such indicated means comprise audible and/or visible warning means and can interrupt the circuit of a pump for the injector so that the apparatus can no longer be operated.

The apparatus of the present invention has an agitator comprising means for forcing developer from one end of a package, as above described, to the other end of the package when the latter is inserted therein. To insure complete processing of the film, the agitator is in the form of two resilient surfaced pads adapted to squeeze a package between the pads and a confronting fixed wall, the pads being mounted at opposite ends of a centrally pivoted rectangular frame. The frame is driven by a flexible connecting rod from an eccentric, the connecting rod being secured adjacent one end of the frame.

A package that is particularly useful with the present invention comprises a liquid-impermeable envelope containing a light-sensitive material, the liquid impermeable envelope having a surface or a surface portion readily pierceable by an injector in such manner that the injector is not likely to score the film contained within the package.

The surface or the surface portion is preferably self-sealing so that after withdrawal of the injector the perforation made thereby seals to prevent the egress of liquid from the package.

Certain grades of polyvinyl chloride are suitable for self-sealing, but, if necessary, the surface or surface portion can be of a different material or backed by a suitably elastic material which will provide the self-sealing.

Another useful embodiment of the package has heat seals along three edges and a folded and unflattened fourth edge so as to present a surface part which is more or less at right angles to the generally plane of the package.

The package can also be provided with a raised blister wherein the injector can be inserted.

The invention also comprises a method of processing a photographic element contained in a liquid impermeable sealed package which comprises the steps of injecting a processing fluid into the package by perforating the same and thereafter withdrawing the injector and agitating the processing fluid within the package. The method of agitation preferably comprises moving the processing fluid from one end of the package to the other.

The various features of novelty which characterize the invention are pointed out with particularity in the claims annexed to and forming a part of the specification. For a better understanding of the invention, the operating advantages and the objectives obtained by its use, reference should be had to the accompanying drawings and descriptive matter in which a preferred embodiment of the invention has been illustrated.

DESCRIPTION OF THE PREFERRED EMBODIMENT

Figure 1:
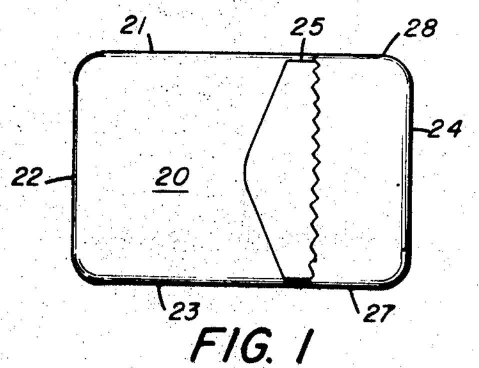
FIG. 1 is a plan view of a preferred form of a package for a photographic element which can be used with the present invention.
Figure 2:
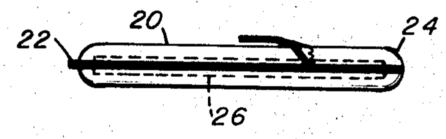
FIG. 2 is a diagrammatic side elevation of the package shown in FIG. 1.

Referring to FIGS. 1 and 2, there is shown a package for a photographic element, in the present instance a Dental film, comprising a moistureproof envelope 20, heat seal on three edges 21, 22, 23, and having a folded over fourth edge 24. A flap 25 is crimp sealed to the top surface of the package 20. By providing a folded edge 24, a portion of the material of the package at that position is provided at right angles to the general plane of the package and facilitates penetration of an injector to be described hereinafter.

The material of the package is preferably of a synthetic plastics material so as to be saliva-proof on insertion of the package into the mouth of a dental patient and to withstand the processing solution. The material, particularly in the region of the folded edge 24, has the property of being self-sealing or has an inner layer (open not shown) which has such a property so that after withdrawal of an injector the package is self-sealing to contain processing fluid therein. The package contains a small photographic element 26, which, in the present instance, is an X-ray sensitive film. It is to be noted, additionally, that the film 26 at that end of the package remote from the folded edge 24 and to maintain the film in such position, crimp seals 27, 28 are provided to locate the film in the position shown. The flap 25 facilitates opening of the package subsequent to processing of the exposed film therein as will be described hereinafter.

Figure 3:
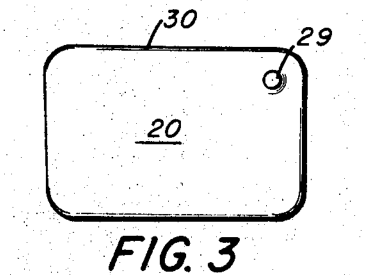
FIG. 3 is a plan view, on a reduced scale, of a second embodiment of packages which can be used with the present invention.
Figure 4:
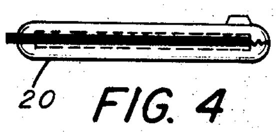
FIG. 4 is a diagrammatic side elevation of the package shown in FIG. 3.

FIGS. 3 and 4 show a further embodiment of the package, wherein on one surface of the package, there is provided a raised blister, 29, which presents a surface such that an injector may be inserted into the package at such position, without scoring the film, for the injection of processing fluid into the package. The blister at least of such a package is preferably of a self-sealing material, such as a highly elastic grade of P.V.C.

Figure 5:
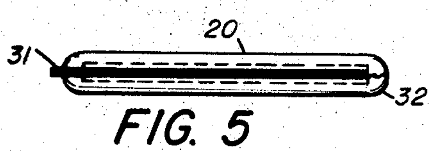
FIG. 5 is a diagrammatic side elevation of the package.

FIG. 5 shows a further simplified embodiment of a package having a peripheral heat seal 31, on three sides thereof, and a folded edge, 32, on the fourth side.

Figure 6:
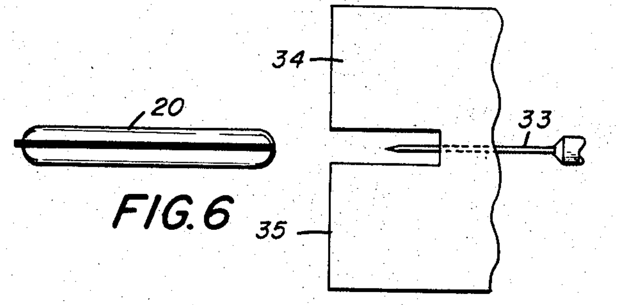
FIGS. 6 and 7 illustrate diagrammatically the manner of insertion in accordance with the present invention of an injector into the package of FIG. 5.
Figure 7:
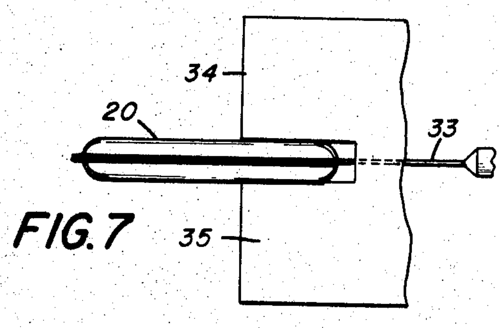
Figure 8:
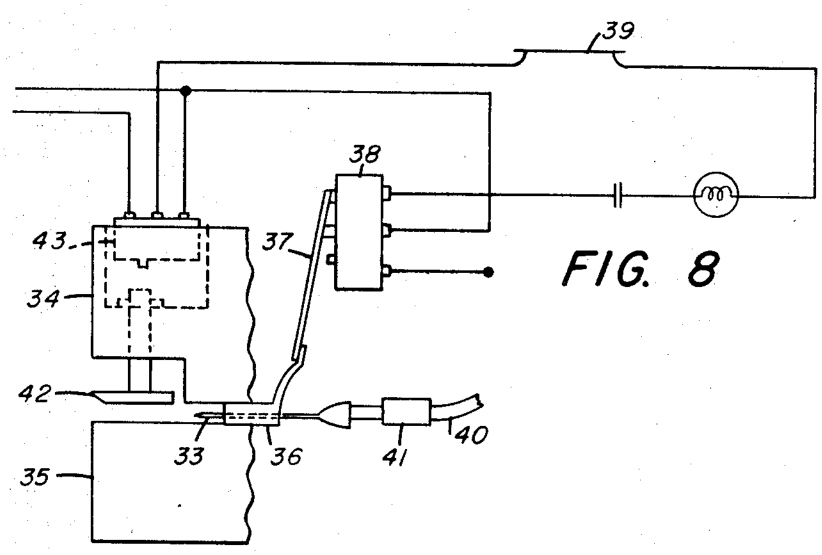
FIG. 8 is a diagrammatic side elevation of the injector device.
Figure 9:
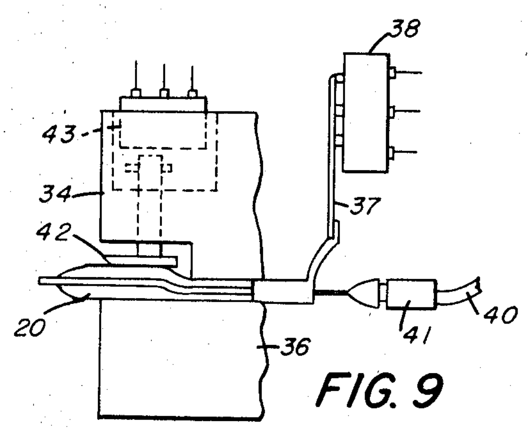
FIG. 9 is a view, similar to FIG. 8, with certain parts having been removed, showing a package having been filled with processing fluid.

FIGS. 6 and 7 show the manner in which processing fluid is injected into the film package. These FIGS. are diagrammatic and are shown with the package being in the form shown in FIG. 5, but it will be appreciated that such diagrammatic apparatus is applicable to the package shown in FIGS. 1 and 2, and with appropriate relocation of the injector 33, with the package shown in FIGS. 3 and 4. The injector 33 is in the form of a hypodermic needle and is located between a pair of jaws 34 and 35. The package is inserted between the jaws so as to impale the package upon the needle which is fixed and the jaws serve to locate the package accurately relative to the needle. FIG. 8 shows, in more detail, although still diagrammatic, the jaws 34 and 35. It will be seen that between the jaws there is located a package sensor, 36, which is connected to a switch arm 37 of a microswitch, 38. Insertion of the package between the jaws 34 and 35 moves the sensor 36 rearwardly so actuating the microswitch 38. The microswitch 38 closes a circuit to a pump 39, which pumps processing fluid through the injector needle 33 and into the package. The conduit 40 from the pump to the injector 33 includes a no-return valve, 41, thus ensuring that no processing fluid leaks from the injector when the package is withdrawn from the jaws. The jaw, 34, includes a resiliently loaded vertically reciprocable platform 42, which is arranged to rest on the package when the package is between the jaws of 34 and 35. As the package swells, due to processing fluid being pumped thereinto, the platform 42 rises and when an appropriate amount of processing fluid has been pumped into the package, the platform 42 operates a microswitch 43 to open the pump circuit. Simultaneously with opening the pump circuit, the microswitch 43 closes a contact to render operative a circuit of an agitator which will be described hereinafter. FIG. 9 shows both microswitches 38 and 43 in their operated condition.

Figures 10, 11:
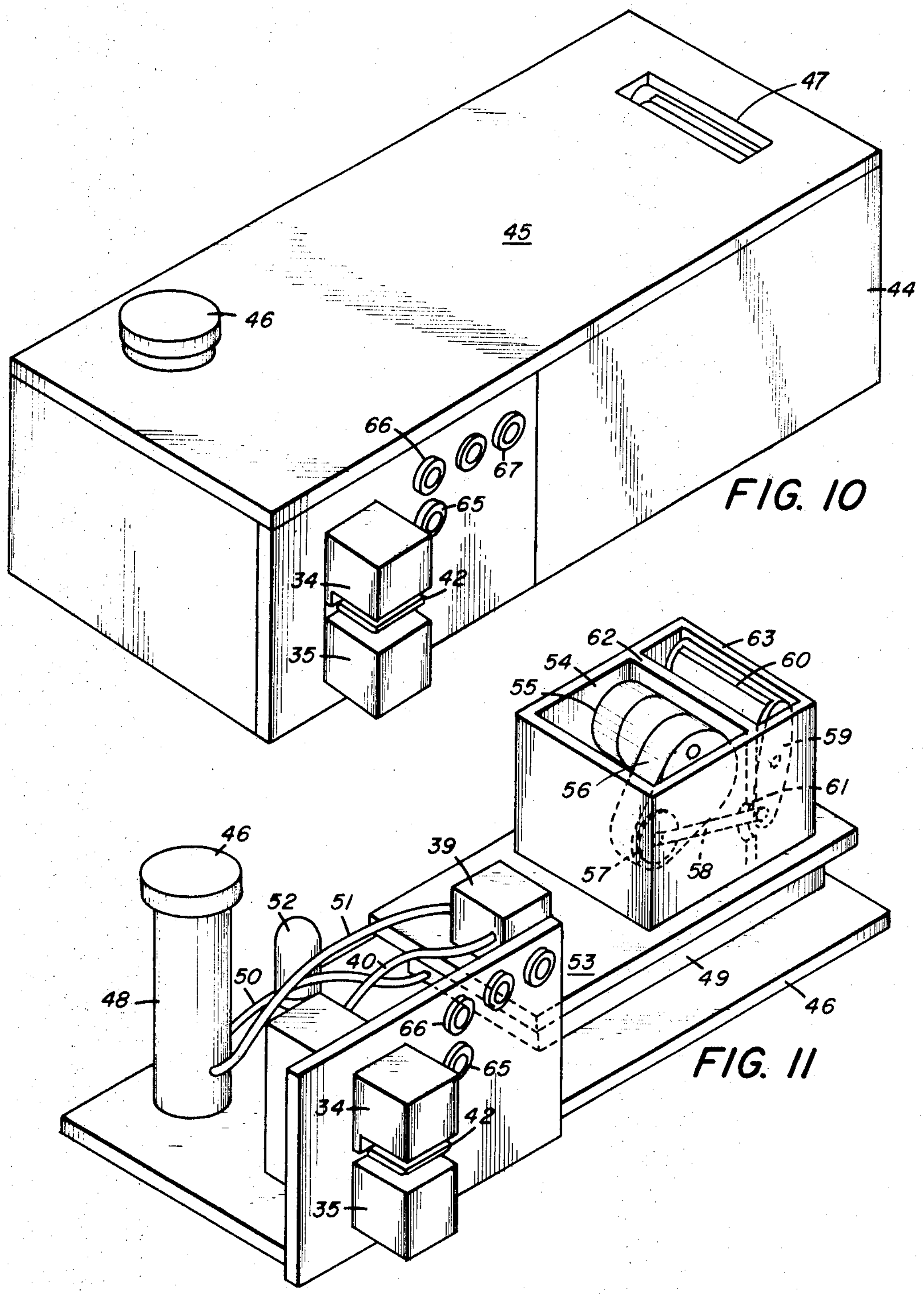
FIG. 10 is a perspective view of a preferred form of apparatus in accordance with the present invention.
FIG. 11 is a view, similar to FIG. 10, showing the apparatus with the cover thereof removed.
Figure 12:
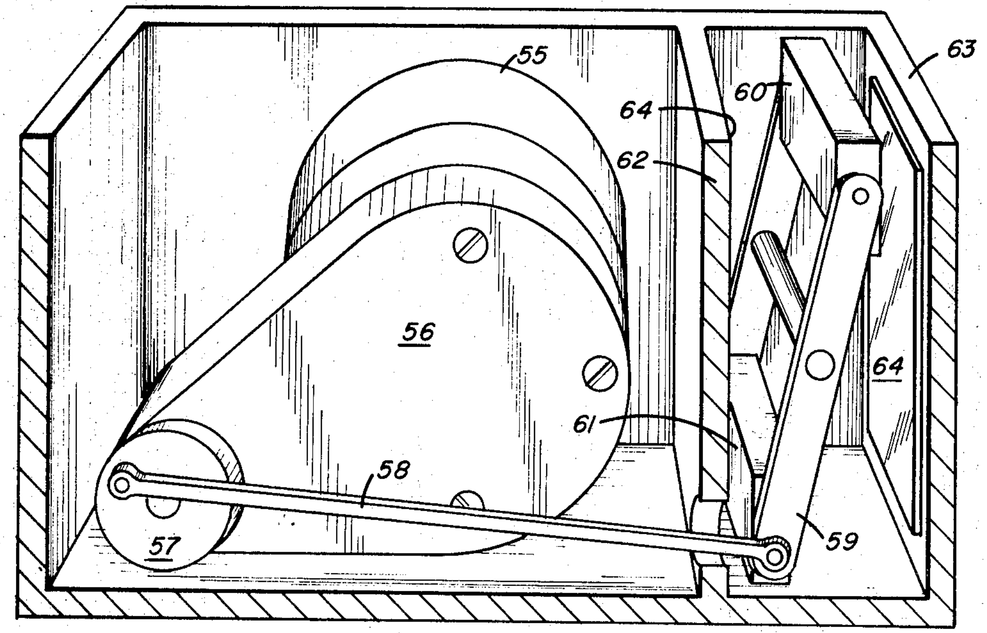
FIG. 12 is a persepective view, parts not being shown, of an agitator mechanism of the apparatus of FIGS. 10 and 11.

FIGS. 10 and 11 are general views of the apparatus of the present invention. Referring to these FIGS., there is shown a housing 44 comprising a removable top cover 45 and base unit 46. The jaws 34, 35 are provided externally of the housing 44. Also provided externally of the housing 44 is a filler having a cap 46 whereby additional processing fluid can be added to the apparatus as and when required. The cover 45 also includes a slot 47 permitting access to an agitator mechanism which will be described hereinafter. As seen in FIG. 11, the filler cap 46 is secured into a funnel 48 which is connected by a duct 50 to a reservoir 49 and by a duct 51 to the pump 39. The reservoir should be of variable volume to adapt itself in volume to the residual volume of fluid. The conduit 40 connects the pump to the injector 33 via the one-way valve 41.

Mounted on the base 46 is a 15-watt pigmy bulb 52 which serves to maintain the temperature internally of the housing 44 at a convenient temperature, for example, 24° C. The bulb may be in a circuit with an appropriate electric thermostat (open not shown).

Figure 13:
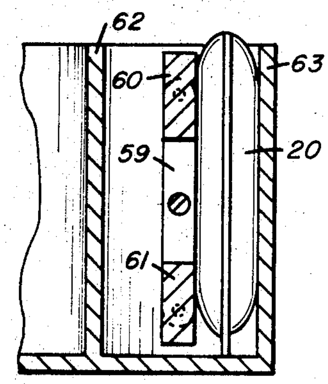
FIGS. 13, 14 and 15 are diagrammatic side elevations showing the manner in which the processing fluid is agitated in a package to develop the photographic element therein.
Figure 14:
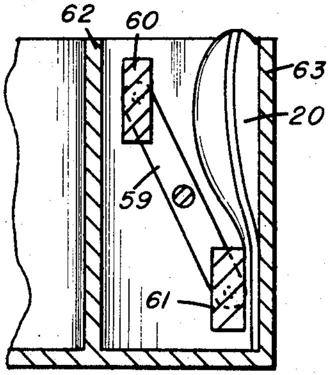
Figure 15:
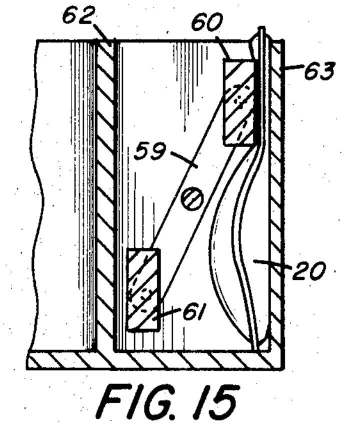

A platform 53, besides supporting the pump 39, also supports the agitator unit which is accessible from externally on the housing 44 through the slot 47. The agitator mechanism comprises a casing 54 supporting a constant speed motor 55 therein which motor drives through a reduction gear 56, an eccentric 57 connected via a flexible connecting rod 58 to a frame 59 of the agitator. The flame 59 is rectangular and is pivotally mounted centrally on two opposite sides. The two other opposite sides are defined by paddle members 60, 61, which are mounted at opposite ends of the frames 59. The paddles 60, 61 are covered with a resilient material, for example, a filmed synthetic plastics material and the agitator mechanism operates between walls 62, 63 which are also preferably covered with a filmed plastics material 64. The agitator conveniently receives packages on each side of the frame 59 and operates in a manner best illustrated in FIGS. 13, 14 and 15. As will be seen from these FIGS., A package inserted between the frame 59 and a wall 62 or 63 of the agitator mechanism is firstly pressed at one end and thereafter at the other end and such pressing is continued for the period of agitation. Such pressure on the package at opposite ends causes the processing fluid to move, fairly rapidly, from end to end of the pack, and, in consequence, ensures an even development. It is to be noted that only one package is shown in FIGS. 13, 14 and 15 but it will be appreciated that a package could be inserted between the frame 59 and the wall 62 and would be agitated alternately with the type between the frame 59 and the wall 63. The flexible connecting rod 58 serves to prevent overload of the motor 55 and to provide a lost motor connection should any package be too full.

Figure 16:
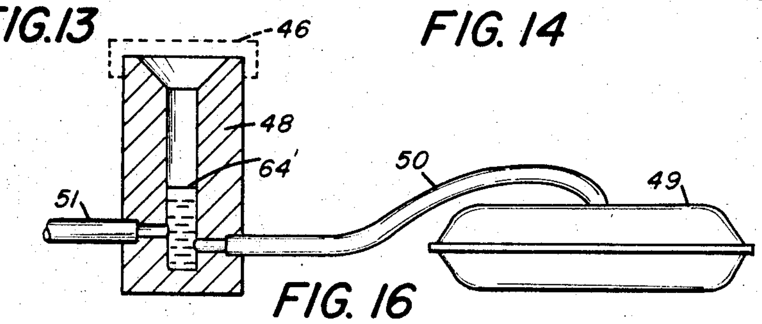
FIG. 16 is a diagrammatic side elevation of a processing fluid container showing a filling arrangement and a flexible reservoir therefore.

FIG. 16 shows the manner in which the processing fluid is contained within the apparatus. The flexible reservoir 49 is connected via the duct 50 to the funnel 48 and, through the duct 51 to the pump 39. The funnel 48 includes a float member 64′ therein so as to reduce the surface of processing fluid which is open to the atmosphere and hence capable of degrading. It is preferred, although not shown, that a sensing means such as a microswitch be provided to sense the flexible reservoir 49 to indicate when the fluid content thereof has dropped to a level such that the apparatus should be topped up.

In operation, a dentist, for example, after having taken a radiograph of the patient's jaw, will insert the package, fold forward, into the jaws 34, 35. In so doing, the sensor 36 will be moved rearwardly and at the same time as the injector needle 33 penetrates the wall of the package, the microswitch 38 is actuated to switch on the pump and a panel light, 65, for example green, will also be energized to indicate that the pump is pumping processing fluid through the injector 33 into the package 20. When the package 20 is full, the platform 42 will have been raised to operate the microswitch 43 to deactivate the pump and to set the agitator mechanism in operation. The package is then inserted through the slot 47 into the agitator mechanism so as to lie between the frame 59 and one of the walls 62, 63. A timer mechanism may be incorportated in the apparatus so as to activate the agitator for a set time. After such set time, an audible warning may be given to indicate that the processing of the film within the package is complete.

It will be appreciated that the agitator of the present invention will receive and process simultaneously up to six periapical or child-size packages or two occlusal size packages, or one occlusal size package and up to three other size packages. The processing of only one package has been described for convenience. In such instance where more than one package is to be processed, it is intended that the agitator will run for the set time after the last operation of the microswitch 43, and as the films in dental radiograph packages become fixed by the combined developing-fixing solution this does not harm the development of films inserted, in their packages, in the agitator mechanism before the last package.

The panel whereon the jaws 34, 35 are mounted may also include a red warning light 66 which comes into operation when the flexible reservoir contains insufficient solution. A third warning light 67 may be included on the panel so as to indicate when the apparatus has been switched on.

The invention is not confined to the precise details of the foregoing example and many variations are possible within the scope thereof. For example, in order to prevent blockage through evaporation in the injector 33, it is preferred that a keeper be provided for insertion between the jaws 34 and 35 when the apparatus of the invention is not in use.

The agitator mechanism may be so arranged as to receive more than six small packages or two large packages or a combination thereof depending on the requirements of the particular dental practice.

It is also to be appreciated, of course, that the invention is not confined to its use in processing of dental radiographs as it is perfectly possible to package other films such as normal X-ray film in moisture impermeable packages of a synthetic plastics material, to seal such packages and to process the same, after exposure, in exactly the same way.

It will be appreciated that the apparatus may be modified so that the single needle may be capable of sequentially injecting firstly one or more developing fluids, evacuating the fluids from the package after development of the light-sensitive element, injecting a fixing fluid and subsequently, if required evacuating the fixing fluid. Alternatively, several injectors may be provided each arranged to inject and/or evacuate a particular fluid from the package.

The invention has been described in detail with particular reference to a preferred embodiment thereof, but it will be understood that variations and modifications can be effected within the spirit and scope of the invention as described hereinabove and as defined in the appended claims.

We claim:

1. An apparatus for processing a photosensitive film contained in a hermetically sealed packet comprising:
   - a pair of jaws for engaging opposite sides of such packet to locate said packet in a predetermined position for injecting processing fluid therein;
   - means operatively associated with said pair of jaws for generating a signal upon detecting the presence of a packet in said position;
   - piercing means including a hollow tubular member for piercing the packet and for conducting such fluid into the packet;
   - control means responsive to said signal from said generating means for initiating the flow of such fluid through said piercing means;
   - means engageable with said packet for producing a signal upon sensing a predetermined distension of the packet;
   - terminating means responsive to said signal from said producing means for terminating the flow of such fluid into the packet;
   - whereby a designated amount of such fluid is injected into said packet for processing the film contained therein.

2. The invention according to claim 1 and further comprising an alarm responsive to said signal from said producing means for indicating that the desired volume of fluid has been injected into the packet.

3. The invention according to claim 1 further including means for agitating the fluid injected into the packet to facilitate complete distribution of said fluid on said film comprising:
   - means for holding said packet on opposite ends during agitation; and
   - means associated with said packet holding means for alternately pressing opposite ends of the packet to cause the fluid contained therein to move back and forth on the film.

4. The invention according to claim 3 wherein said agitating means is actuated in response to said signal from said producing means.

5. The invention according to claim 3 wherein said holding means comprises:
   - packet engaging pads mounted at opposite ends of a rectangular frame for contacting the opposite ends of the packet;
   - wall means spaced from the frame mounted pads for receiving a packet therebetween; and
   - means pivotally mounting said frame for oscillatory movement about an axis intermediate the pads such that when a packet is placed between the packet engaging pads and said wall means, said packet is alternately pressed at opposite ends by the pads.